United States Patent
Kim et al.

(10) Patent No.: US 12,119,975 B2
(45) Date of Patent: Oct. 15, 2024

(54) WIRELESS COMMUNICATION DEVICE AND OPERATING METHOD SUPPORTING CARRIER AGGREGATION

(71) Applicant: SAMSUNG ELECTRONICS CO., LTD., Suwon-si (KR)

(72) Inventors: Jinho Kim, Seoul (KR); Jungmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 17/660,067

(22) Filed: Apr. 21, 2022

(65) Prior Publication Data

US 2022/0345345 A1 Oct. 27, 2022

(30) Foreign Application Priority Data

Apr. 27, 2021 (KR) .................. 10-2021-0054633

(51) Int. Cl.
| | |
|---|---|
| *H04W 72/04* | (2023.01) |
| *H04L 5/00* | (2006.01) |
| *H04L 27/26* | (2006.01) |
| *H04W 76/00* | (2018.01) |
| *H04W 88/08* | (2009.01) |

(52) U.S. Cl.
CPC ........ *H04L 27/2613* (2013.01); *H04L 5/0051* (2013.01); *H04L 5/006* (2013.01)

(58) Field of Classification Search
USPC ........................................................ 370/329
See application file for complete search history.

(56) References Cited

U.S. PATENT DOCUMENTS

| | | |
|---|---|---|
| 9,312,935 B2 | 4/2016 | Ketchum et al. |
| 10,116,483 B2 | 10/2018 | Islam et al. |
| 10,367,672 B2 | 7/2019 | Akkarakaran et al. |
| 10,659,119 B2 | 5/2020 | Li et al. |
| 10,735,169 B2 | 8/2020 | Kim et al. |
| 10,862,644 B2 | 12/2020 | Li et al. |
| 2019/0149295 A1 | 5/2019 | Wang et al. |

(Continued)

FOREIGN PATENT DOCUMENTS

KR 10-2126945 6/2020

OTHER PUBLICATIONS

Extended European Search Report dated Jan. 9, 2023 in corresponding European Patent Application No. 22168982.1 (16 pages).

(Continued)

*Primary Examiner* — Maharishi V Khirodhar
(74) *Attorney, Agent, or Firm* — F. CHAU & ASSOCIATES, LLC

(57) ABSTRACT

A user terminal supporting carrier aggregation (CA) and an operating method thereof are provided. The operating method includes receiving indication information regarding a phase tracking reference signal (PTRS) component carrier (CC) group from a base station; determining whether a phase noise characteristic of the user terminal is the same with respect to CCs included in the PTRS CC group, based at least in part on the indication information; requesting the base station to transmit at least one PTRS using at least one CC included in the PTRS CC group; and receiving the at least one PTRS from the base station using the at least one CC.

20 Claims, 16 Drawing Sheets

(56) References Cited

U.S. PATENT DOCUMENTS

| | | |
|---|---|---|
| 2020/0052930 A1 | 2/2020 | Kim et al. |
| 2020/0220755 A1 | 7/2020 | Maki et al. |
| 2020/0295893 A1* | 9/2020 | Maki ................. H04J 11/005 |
| 2020/0395988 A1 | 12/2020 | Lee et al. |
| 2023/0054308 A1* | 2/2023 | Yang .................. H04L 5/0007 |

OTHER PUBLICATIONS

Moderator (Intel Corporation), "Issue Summary for physical layer changes for supporting NR from 52.6 GHz to 71 GHz", 3GPP Draft; R1-2009313, 3rd Generation Partnership Project (3GPP), Mobile Competence Centre; 650, Route Des Lucioles; F-06921 Sophia-Antipolis Cedex; France, e-Meeting, Oct. 26-Nov. 13, 2020, 40 pages.

Qi, et al., "On the Phase Tracking Reference Signal (PT-RS) Design for 5G New Radio (NR)", 2018 IEEE 88th Vehicular Technology Conference (VTC-FALL), IEEE, Aug. 27, 2018 (Aug. 27, 2018), pp. 1-5, XP033535426, DOI: 10.1109/VTCFALL.2018.8690852 [retrieved on Apr. 12, 2019].

Partial European Search Report dated Sep. 20, 2022 in corresponding European Patent Application No. 22168982.1 (15 pages).

Panasonic, "PT-RS design", 3GPP Draft; R1-1720370RT-RS, 3rd Generation Partnership Project (3GPP), Mobile Competence Centre; 650, Route Des Lucioles; F-06921 Sophia-Antipolis Cedex; France, vol. RAN WG1, No. Reno, USA; Oct. 1, 2017, Nov. 17, 2017, 9 pages.

* cited by examiner

FIG. 5B

| Scheduled MCS | Time density ($L_{PT-RS}$) |
|---|---|
| $I_{MCS} <$ ptrs-MCS$_1$ | PT-RS is not present |
| ptrs-MCS$_1 \leq I_{MCS} <$ ptrs-MCS$_2$ | 4 |
| ptrs-MCS$_2 \leq I_{MCS} <$ ptrs-MCS$_3$ | 2 |
| ptrs-MCS$_3 \leq I_{MCS} <$ ptrs-MCS$_4$ | 1 |

FIG. 5C

| Scheduled bandwidth | Frequency density ($K_{PT-RS}$) |
|---|---|
| $N_{RB} < N_{RB0}$ | PT-RS is not present |
| $N_{RB0} \leq N_{RB} < N_{RB1}$ | 2 |
| $N_{RB1} \leq N_{RB}$ | 4 |

WIRELESS COMMUNICATION DEVICE AND OPERATING METHOD SUPPORTING CARRIER AGGREGATION

CROSS-REFERENCE TO RELATED APPLICATION

This application is based on and claims priority under 35 U.S.C. § 119 to Korean Patent Application No. 10-2021-0054633, filed on Apr. 27, 2021, in the Korean Intellectual Property Office, the disclosure of which is incorporated by reference herein in its entirety.

TECHNICAL FIELD

This disclosure relates generally to a wireless communication device supporting carrier aggregation (CA), and more particularly, to a wireless communication device and method for transmitting and receiving a phase tracking reference signal (PTRS) for phase noise compensation.

DISCUSSION OF THE RELATED ART

Wireless communication devices ("wireless devices") may embed data in a carrier, modulate a radio frequency (RF) signal, and amplify and transmit a modulated RF signal to a wireless communication network. On the receive side, an RF signal received from a wireless communication network is amplified and demodulated by the wireless device. For transmitting and receiving ("transceiving") data at a higher data rate, wireless devices may support transceiving of carrier aggregated RF signals, i.e., multi-carrier modulated RF signals.

When wireless devices support carrier aggregation (CA), phase noise may occur during frequency conversion between an RF signal and a baseband signal. In general, phase noise is higher at higher frequencies. Phase noise in the frequency domain may cause signal jitter in the time domain.

The fifth-generation (5G) new radio (NR) standards introduce a PTRS as a reference signal for channel estimation to compensate for phase noise. The 5G NR standards define an ultrahigh frequency band called mmWave to support high speed and new service, but at the expense of worsening phase noise. Therefore, approaches for efficiently managing PTRS resources are desired.

SUMMARY

Embodiments of the inventive concept provide a wireless communication device and method for transceiving a phase tracking reference signal (PTRS) using a PTRS component carrier (CC) group to efficiently manage PTRS wireless resources.

According to an aspect of the inventive concept, there is provided an operating method of a user terminal. The operating method includes receiving indication information regarding a phase tracking reference signal (PTRS) component carrier (CC) group from a base station; determining whether a phase noise characteristic of the user terminal is the same with respect to CCs included in the PTRS CC group, based at least in part on the indication information; requesting the base station to transmit at least one PTRS using at least one CC included in the PTRS CC group, in accordance with the determination; and receiving the at least one PTRS from the base station using the at least one CC.

According to another aspect of the inventive concept, there is provided an operating method of a user terminal. The operating method includes receiving indication information regarding a PTRS CC group from a base station; receiving first through N-th PTRSs from the base station using N CCs constituting the PTRS CC group, where N is a natural number of at least two; determining whether a phase noise characteristic of the user terminal is the same with respect to the N CCs based at least in part on the indication information; and performing cooperative phase noise compensation based on the first through N-th PTRSs when it is determined that the phase noise characteristic of the user terminal is the same.

According to a further aspect of the inventive concept, there is provided a user terminal including a transceiver configured to receive indication information regarding a PTRS CC group from a base station; and a controller configured to determine whether a phase noise characteristic of a user terminal is the same with respect to CCs included in the PTRS CC group, based at least in part on the indication information, and request the base station to transmit at least one PTRS using at least one CC included in the PTRS CC group, wherein the transceiver is further configured to receive the at least one PTRS from the base station using the at least one CC.

In still another aspect, an operating method of a user terminal in a wireless communication system supporting CA includes receiving, from a base station, indication information regarding a PTRS CC group, where the PTRS CC group has a plurality of CCs generated at the base station with a same phase noise characteristic. A PTRS associated with the PTRS CC group is received from the base station. At least two CCs of the PTRS CC group is received from the base station. The method compensates for phase noise of each of the at least two CCs using the received PTRS.

BRIEF DESCRIPTION OF THE DRAWINGS

Embodiments of the inventive concept will be more clearly understood from the following detailed description taken in conjunction with the accompanying drawings in which:

FIG. 5B is a table showing a time density of a PTRS with respect to a modulation coding scheme (MCS); FIG. 5C is a table showing a frequency density of a PTRS with respect to an MCS;

DETAILED DESCRIPTION OF EMBODIMENTS

Hereinafter, embodiments will be described in detail with reference to the accompanying drawings.

Figure 1:
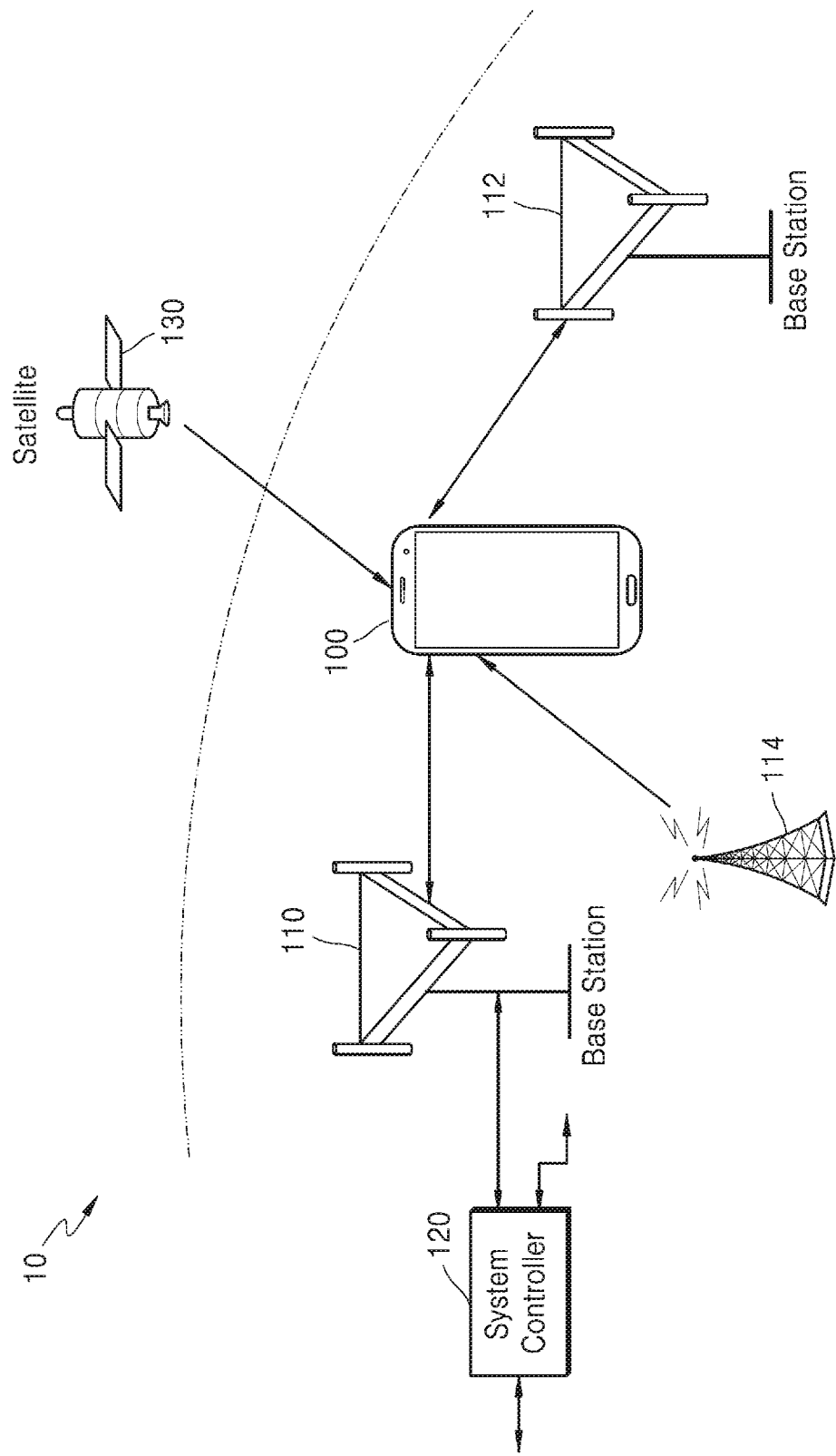
FIG. 1 is a schematic block diagram of a wireless communication system according to an example embodiment.

FIG. 1 is a schematic block diagram of a wireless communication system 10 according to an example embodiment.

The wireless communication system 10 may refer to any system including a user terminal 100 (a wireless communication device) and a base station 110. For example, the wireless communication system 10 may correspond to one of a new radio (NR) system, a fifth-generation (5G) NR system, a fourth-generation (4G) long term evolution (LTE) system, a 4G LTE-advanced system, a code division multiple access (CDMA) system, a global system for mobile communication (GSM), a wireless local area network (WLAN) system, and the like. A CDMA system may be implemented in various CDMA versions such as wideband CDMA, time division-synchronous CDMA (TD-SCDMA), and CDMA 2000. Hereinafter, the wireless communication system 10 will be described mainly referring to a 5G system, but embodiments are not limited thereto.

Wireless communication networks of the wireless communication system 10 may support communication among a plurality of users by sharing available network resources. For example, information may be transferred through wireless communication networks in various multiple access modes such as a CDMA mode, a frequency division multiple access (FDMA) mode, a time division multiple access (TDMA) mode, an orthogonal FDMA (OFDMA) mode, a single carrier FDMA (SC-FDMA) mode, an OFDM-FDMA mode, an OFDM-TDMA mode, and an OFDM-CDMA mode.

The base station 110 may generally refer to a fixed station that communicates with the user terminal 100 and/or another base station 112 and may exchange data and control information with the user terminal 100 and/or another cell. For example, a base station may be referred to as a cell, a node B, an evolved-node B (eNB), a next generation node B (gNB), a sector, a site, a base transceiver system (BTS), an access point (AP), a relay node, a remote radio head (RRH), a radio unit (RU), or a small cell. A base station herein may be interpreted as referring to a partial area or function, which is covered by a base station controller (BSC) in CDMA, a node-B in wideband CDMA (WCDMA), an eNB in LTE, or a gNB or a sector (or site) in NR, in a comprehensive sense and may include various coverage regions, such as a mega cell, a macro cell, a micro cell, a pico cell, a femto cell, a relay node, an RRH, an RU, and a small-cell communication range.

The user terminal 100 of the wireless communication system 10 may be stationary or mobile and may refer to any device that transmits and receive data and/or control information to and from a base station. For example, the user terminal 100 may be referred to as a user equipment, a terminal equipment, a mobile station (MS), a mobile terminal (MT), a user terminal (UT), a subscriber station (SS), a wireless device, or a handheld device.

The wireless communication system 10 may include a plurality of base stations, e.g., 110 and 112, and a system controller 120. The wireless communication system 10 may include a plurality of cells and a plurality of network entities. The base stations 110 and 112 may each transmit and receive a data signal or control information by communicating with the user terminal 100 or another cell. The user terminal 100 may communicate with the wireless communication system 10 and receive signals from a broadcast station 114. Furthermore, the user terminal 100 may receive a signal from a satellite 130 of a global navigation satellite system (GNSS). The user terminal 100 may support radio techniques for various kinds of wireless communication.

Embodiments may be applied to communication entities, which form an uplink channel and/or a downlink channel in the wireless communication system 10. Hereinafter, descriptions mainly focus on the user terminal 100 and the base station 110 as entities of wireless communication to which embodiments are applied.

Each of the user terminal 100 and the base station 110 may operate as a transmitter or a receiver. When the user terminal 100 operates as a transmitter, the base station 110 may operate as a receiver. When the base station 110 operates as a transmitter, the user terminal 100 may operate as a receiver.

As data connection paths, a downlink channel and an uplink channel may be formed between the user terminal 100 and the base station 110. It may be assumed that the state of the downlink channel may be the same as or similar to the state of the uplink channel. The reciprocity of the downlink channel and the uplink channel may be effective in a time division duplex (TDD)-based wireless communication system, in which an uplink and a downlink share a frequency spectrum with each other and are separate from each other in the time domain. Reciprocity of the downlink may also be predicted in a frequency division duplex (FDD)-based wireless communication system, in which uplink and downlink use different frequency spectrums.

The wireless communication system 10 may support carrier aggregation (CA) using a plurality of carriers. CA may be defined as a technique used in wireless communication to increase the data rate per user by assigning a plurality of frequency blocks (called component carriers) to the same user. In an embodiment, the user terminal 100 and the base station 110 may communicate with each other using a plurality of carriers that are merged to generate a first signal through CA. In other words, the user terminal 100 and the base station 110 may exchange data simultaneously using a plurality of carriers. A carrier used by the user terminal 100 and the base station 110 in CA may be called a component carrier (CC), and a frequency spectrum transmitted via modulation of a single CC may be called a frequency channel. A frequency channel may be included in a frequency band. A frequency band may include a plurality of contiguous frequency channels. As described below with reference to FIGS. 2A through 2C, frequency channels used by the user terminal 100 and the base station 110 in CA may vary. Hereinafter, a signal received through a given CC may be called a CC signal.

According to an embodiment, the user terminal 100 may receive a downlink phase tracking reference signal (PTRS) transmitted using CA through at least one antenna of the base station 110. The base station 110 may receive an uplink PTRS transmitted through at least one of a plurality of antennas of the user terminal 100. A PTRS may be used to reduce or minimize phase noise generated from a transmitter in a millimeter wave band. To this end, a PTRS may be used for phase tracking with respect to a common phase error (CPE) occurring in every subcarrier in an OFDM system. Hereinafter, in the following description it is assumed that the base station 110 transmits a PTRS and the user terminal 100 receives the PTRS. As noted above, the user terminal 100 may alternatively transmit a PTRS to the base station 110; the operations described below may be analogously applied to this case as well.

According to the 5G NR standards, a wireless communication system supporting CA may transmit a PTRS independently for each CC to compensate for phase noise. CCs may experience the same or different phase noise according to whether the user terminal 100 receives data using the same phase noise producing RF component (or analog component) (hereafter, just "RF component") of the user terminal 100, or whether the base station 110 transmits data using the same RF component of the base station 110. The phase noise characteristic of a CC due to the RF component of the base station 110 may be called the "phase noise characteristic of the base station 110", and the phase noise characteristic of a CC due to the RF component of the user terminal 100 may be called the "phase noise characteristic of the user terminal 100".

The phase noise producing RF component at each of the base station 110 and the user terminal 100 may be a local oscillator (LO). Because the user terminal 100 does not recognize information about a phase noise producing RF component of the base station 110 for each CC, e.g., whether the phase noise characteristic of the base station 110 due to the RF component is the same among CCs, a conventional user terminal receives a PTRS independently for each CC to perform phase noise tracking using each PTRS. However, the user terminal 100 often uses a single RF component when transceiving a signal using a plurality of CCs in an actual implementation. For example, the user terminal 100 may receive a signal using a single RF component and then divide the signal by CCs when processing the signal. In this case, phase noise characteristics may be the same or similar to each other among CCs, and a PTRS is redundantly transmitted by CCs with respect to received signals having the same or similar phase noise characteristics. As a result, wireless resources may not be efficiently managed.

According to an example embodiment, the wireless communication system 10 supporting CA does not need to transmit a PTRS redundantly per CC and may thus reduce wireless resources used for PTRS transceiving. As a result, wireless resources may be efficiently managed.

Figure 2A:
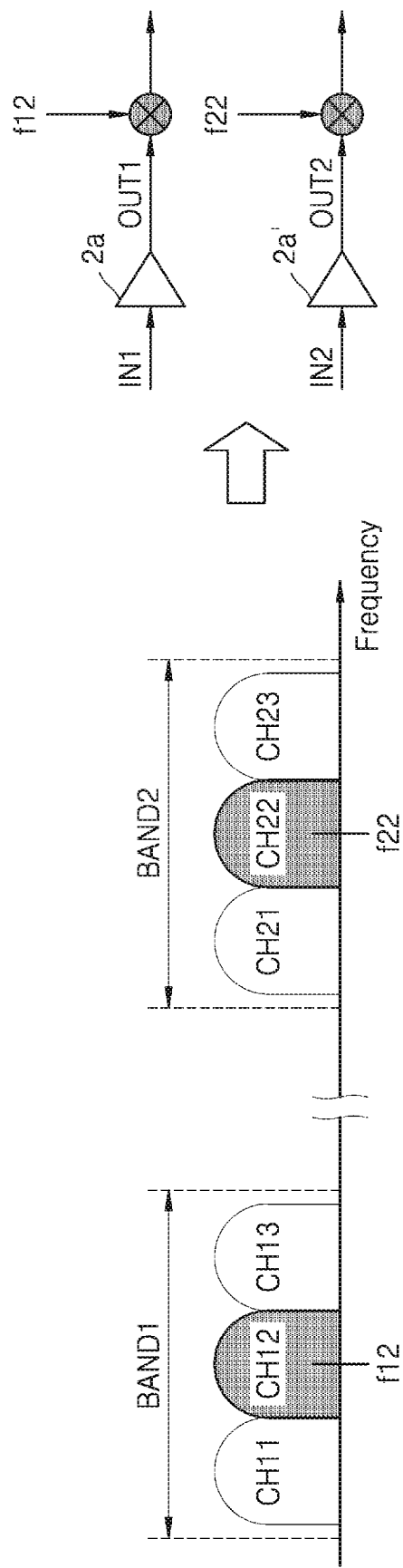
FIGS. 2A through 2C illustrate example types of carrier aggregation and example structures of a receiver circuit, which extracts a carrier signal from frequency channels corresponding to the types.
Figure 2B:
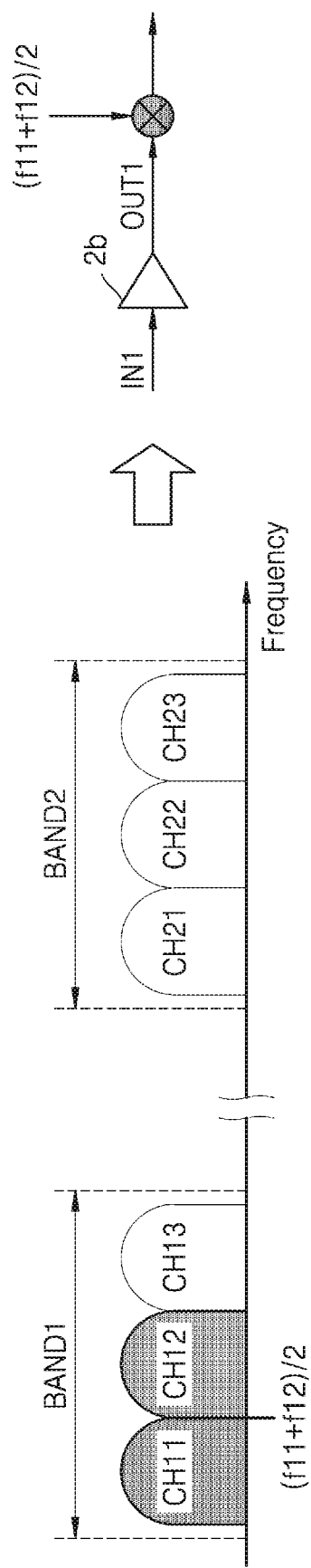
Figure 2C:
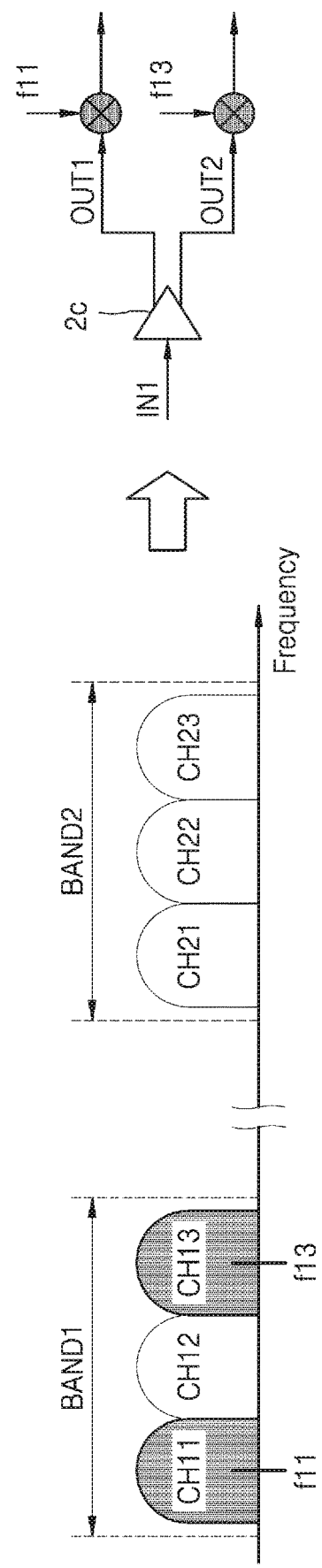

FIGS. 2A through 2C illustrate example types of carrier aggregation and example structures of a receiver circuit that extracts a carrier signal from frequency channels corresponding to the CA types.

In detail, FIG. 2A illustrates inter-band CA, FIG. 2B illustrates intra-band contiguous CA, and FIG. 2C illustrates intra-band non-contiguous CA. In the embodiments of FIGS. 2A through 2C, it is assumed that two frequency bands, e.g., a first frequency band BAND1 and a second frequency band BAND2, may be used for data transmission and each frequency band may have three frequency channels (or three carriers). In other embodiments, each frequency band may have more or fewer frequency channels.

Referring to FIG. 2A, in the inter-band CA, frequency channels assigned to one user or one communication session may lie in different frequency bands. For example, as shown in FIG. 2A, frequency channels CH12 and CH22 may be respectively included in the first frequency band BAND1 and the second frequency band BAND2 and may thus be non-contiguous and in some cases distant from each other. (Note that even if the two bands are adjacent, the two channels in this case are still non-contiguous due to separation by guard bands at the edges of each band.) Two low-noise amplifiers (LNAs) 2a and 2a' may respectively output a first output signal ("first amplified carrier signal") OUT1 and a second output signal ("second amplified carrier signal") OUT2 by respectively amplifying a first carrier signal IN1 and a second carrier signal IN2. (The first and second carrier signals IN1 and IN2 may be modulated carrier signals, which produce a spectrum about the carrier frequencies as illustrated in FIGS. 2A-2C.) The first and second output signals OUT1 and OUT2 may be frequency down-converted into baseband signals using frequencies f12 and f22 respectively corresponding to the frequency channels CH12 and CH22.

Referring to FIG. 2B, in the intra-band contiguous CA, frequency channels assigned to one user or one communication session may be contiguous in the same frequency band. For example, as shown in FIG. 2B, frequency channels CH11 and CH12 may be contiguous in the first frequency band BAND1. A low-noise amplifier 2b may output a first output signal OUT1 by amplifying the first carrier signal IN1. The first output signal OUT1 may be frequency down-converted using an average frequency, i.e., (f11+f12)/2, of frequencies f11 and f12 of carriers corresponding to the frequency channels CH11 and CH12.

Referring to FIG. 2C, in the intra-band non-contiguous CA, frequency channels may be non-contiguous (separated from each other) in the same frequency band. For example, as shown in FIG. 2C, frequency channels CH11 and CH13 may be separated from each other in the first frequency band BAND1. In an example of separating the frequency channels CH11 and CH13 from each other in the intra-band non-contiguous CA, as shown in FIG. 2C, a low-noise amplifier 2c may output two output signals, i.e., the first and second output signals OUT1 and OUT2, from the first carrier signal IN1. The first and second output signals OUT1 and OUT2 may be frequency down-converted respectively using frequencies f11 and f13, respectively corresponding to the frequency channels CH11 and CH13.

For example, in the scenario of FIG. 2A, in a conventional system, a PTRS may be transmitted to compensate for phase noise for each of the frequency channels CH12 and CH22. In the scenario of FIG. 2B, a PTRS may be conventionally transmitted per each CC, i.e., for each of the frequency channels CH11 and CH12. In the scenario of FIG. 2C, a PTRS may be conventionally transmitted per each CC, i.e., for each of the frequency channels CH11 and CH13. Thus, two sets of data, each representing one PTRS, are conventionally transmitted for each of the cases of FIGS. 2A, 2B and 2C.

According to an embodiment, a group of CCs having the same phase noise characteristic may be defined as a PTRS CC group. A phase noise characteristic may be determined according to whether transmission and reception are performed using the same RF component and/or whether CCs are in adjacent frequency bands. When the base station 110 transmits only a single PTRS and the user terminal 100 receives the PTRS, CCs in a PTRS CC group configured by the base station 110 may be in adjacent frequency bands or non-contiguous frequency bands. For example, CCs in a PTRS CC group configured by the base station 110 may not be in an inter-band but may be in a contiguous or non-contiguous intra-band.

Figure 3A:
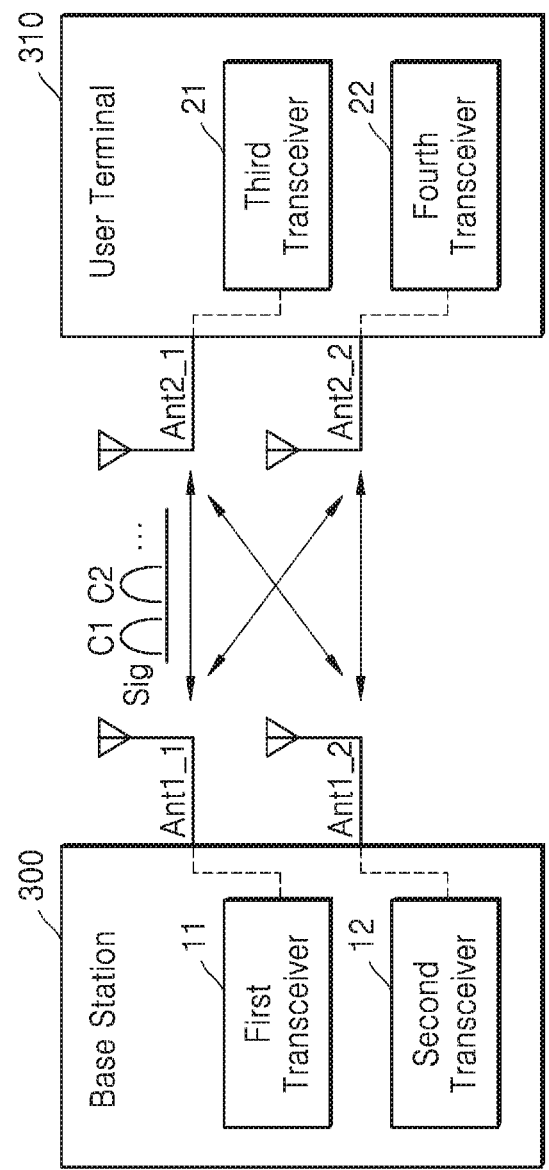
FIGS. 3A and 3B are schematic block diagrams of the structures of a base station and a user terminal, according to example embodiments.
Figure 3B:
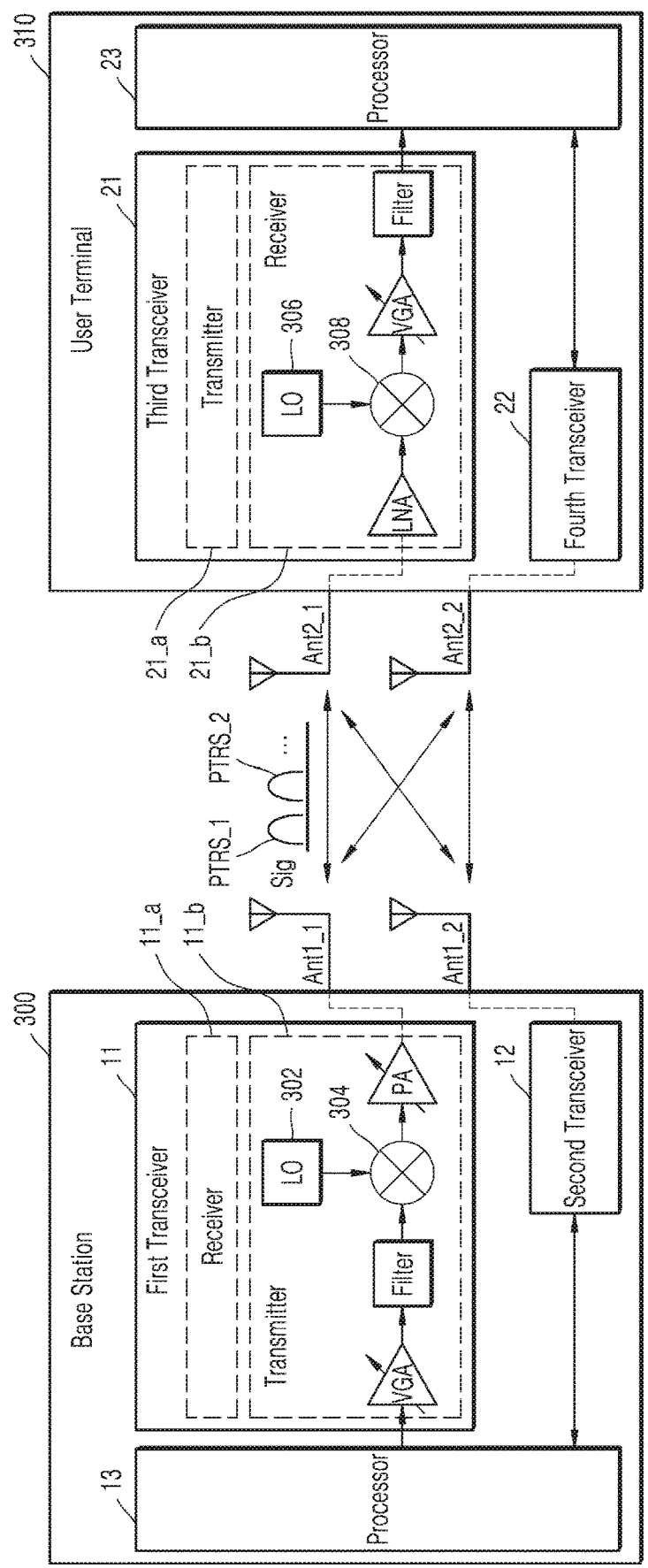

FIGS. 3A and 3B are schematic block diagrams of the structures of a base station and a user terminal, according to example embodiments.

Referring to FIG. 3A, a base station 300 and a user terminal 310 may communicate with each other using multiple-input multiple-output (MIMO). For this operation, each of the base station 300 and the user terminal 310 may include a plurality of antennas, e.g., first and second antennas Ant1_1 and Ant1_2 or third and fourth antennas Ant2_1 and Ant2_2. Although FIG. 3A shows an embodiment in which each of the base station 300 and the user terminal 310 includes two antennas, e.g., the first and second antennas Ant1_1 and Ant1_2 or the third and fourth antennas Ant2_1 and Ant2_2, this is just an example. The base station 300 and the user terminal 310 may each include two or more antennas in other embodiments.

The base station 300 may include a first transceiver 11, a second transceiver 12, the first antenna Ant1_1, and the second antenna Ant1_2. Each of the first transceiver 11 and the second transceiver 12 may be connected to one antenna. For example, the first transceiver 11 may be connected to the first antenna Ant1_1, and the second transceiver 12 may be connected to the second antenna Ant1_2. When the base station 300 operates as a transmitter, the first transceiver 11 and the second transceiver 12 may operate as transmitters. When the base station 300 operates as a receiver, the first transceiver 11 and the second transceiver 12 may operate as receivers.

The first transceiver 11 may generate a first signal Sig by merging a first CC signal C1 with a second CC signal C2 and output the first signal Sig to the user terminal 310. The first transceiver 11 may extract the first and second CC signals C1 and C2 from the first signal Sig. A first CC and a second CC may respectively include a first PTRS and a second PTRS to track phase noise. According to an embodiment, each of the first transceiver 11 and the second transceiver 12 may merge a plurality of CC signals instead of transmitting only one CC signal and extract a plurality of CC signals, instead of only one CC signal, from the first signal Sig. Accordingly, the base station 300 or the user terminal 310 may transmit or receive more carrier signals using the same number of antennas as before, and data throughput may be increased. The second transceiver 12 may be substantially the same as or similar to the first transceiver 11, and thus, descriptions thereof are omitted.

The user terminal 310 may include a third transceiver 21, a fourth transceiver 22, the third antenna Ant2_1, and the fourth antenna Ant2_2. The transceiver aspects of the user terminal 310 may be substantially the same as or similar to those of the base station 300, and thus, descriptions thereof are omitted.

It is assumed in FIG. 3B that the base station 300 transmits a PTRS and the user terminal 310 receives the PTRS.

The base station 300 and the user terminal 310 may respectively further include processors 13 and 23. The processors 13 and 23 may process baseband transceiving signals. In detail, each of the processors 13 and 23 may generate a baseband signal for a transmission signal path and process a baseband signal received through a receive signal path of the third and fourth transceivers 21 and 22. For example, the processor 13 of the base station 300 may perform a process (e.g., encoding or modulation) on data to be transmitted and provide a processed analog output signal to a selected transmitter (e.g., a transmitter 11_b).

Referring to FIG. 3B, the first transceiver 11 of the base station 300 may include the transmitter 11_b and a receiver 11_a. The transmitter 11_b may process a transmission input signal received from the processor 13 and generate an output signal such as a CC signal. As shown in FIG. 3B, the transmitter 11_b may include a variable gain amplifier VGA, a filter, a LO 302, a mixer 304, and a power amplifier PA. The LO 302, which is included in the transmitter 11_b, may be shared with the receiver 11_a, or the receiver 11_a may use another LO, different from the LO 302 included in the transmitter 11_b. LO may be a local oscillator. The LO may be included in a frequency oscillation circuit (not shown). The frequency oscillation circuit may include a plurality of LOs.

Referring to FIG. 3B, the third transceiver 21 of the user terminal 310 may include a transmitter 21_a and a receiver 21_b. The receiver 21_b may generate a receive input signal by processing an input signal such as a CC signal and provide the receive input signal to the processor 23. As shown in FIG. 3B, the receiver 21_b may include a low-noise amplifier LNA, an LO 306 (which may be included in a frequency oscillation circuit (not shown)), a mixer 308, a variable gain amplifier VGA, and a filter. The LO 306, which is included in the receiver 21_b, may be shared with the transmitter 21_a, or the receiver 21_b may use another LO, different from the LO 302 included in the transmitter 21_b.

Hereinafter, it is assumed that a phase noise characteristic originated from an RF component of the base station 300 is the same among CCs included in a PTRS CC group configured by the base station 300. In other words, when the base station 300 transmitting data transmits CC signals using a plurality of CCs and one RF component for the CCs, a group of the CCs may be defined as a PTRS CC group.

For example, referring to FIGS. 2B and 3B, the base station 300 may transmit data using the first transceiver 11 and the frequency channels CH11 and CH12 adjacent to each other. The base station 300 may generate the first signal Sig using the LO 302. At this time, two frequency channels CH11 and CH12 adjacent to each other may be defined as a PTRS CC group. As described above, CC signals transmitted using the frequency channels CH11 and CH12 adjacent to each other are transmitted using one LO. Because data is transmitted using CCs in adjacent frequency channels, using only a single LO, a phase noise characteristic originated from the base station may be the same for each CC signal.

Figure 4:
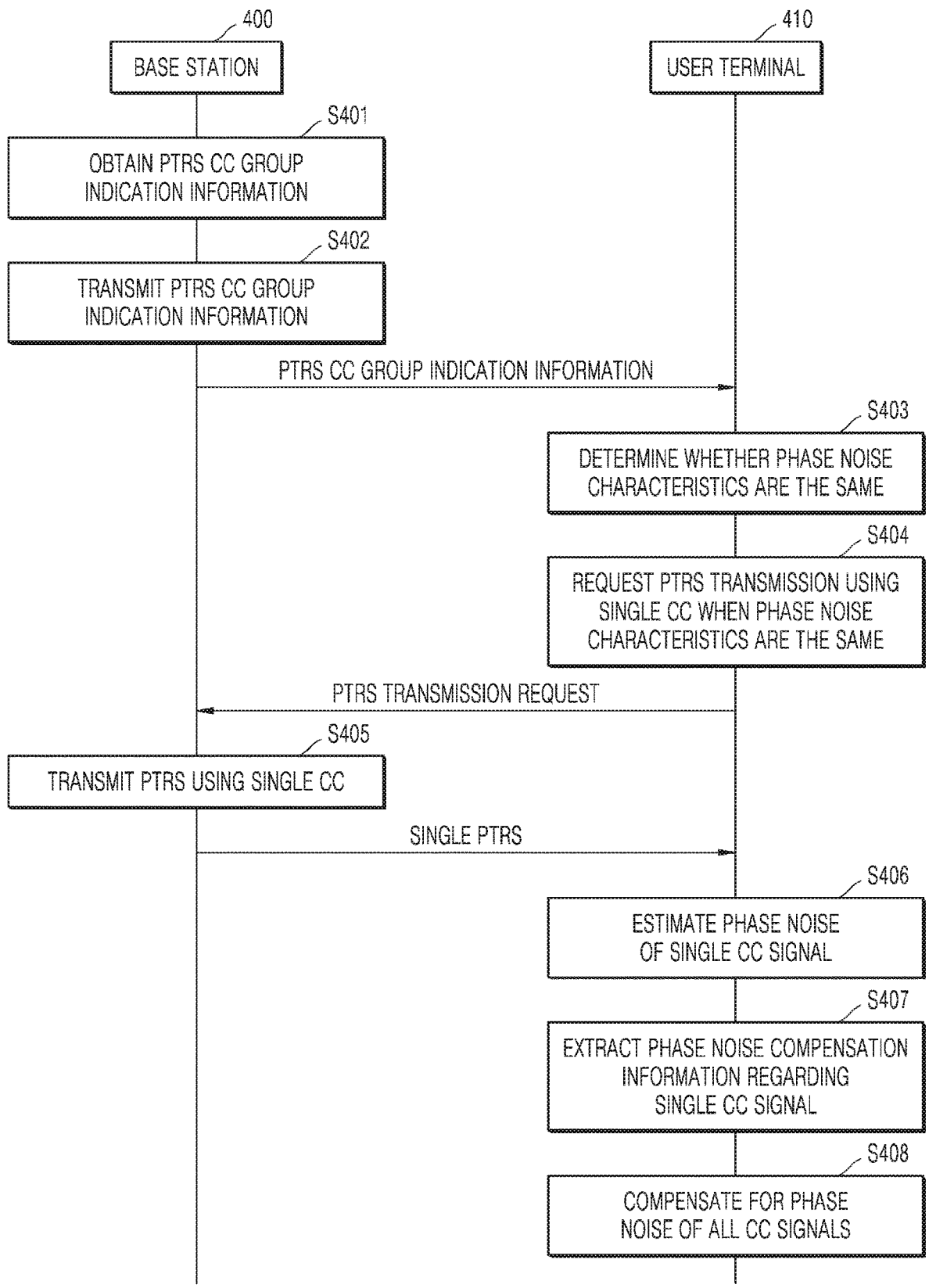
FIG. 4 is a flowchart of the operations of a base station and a user terminal, according to an example embodiment.

FIG. 4 is a flowchart of the operations of a base station and a user terminal, according to an example embodiment.

FIG. 4 shows a PTRS transmission scenario of a base station 400 and a user terminal 410 in the case where the phase noise characteristic of the user terminal 410 is the same among CCs in a PTRS CC group when the base station 400 transmits data to the user terminal 410.

The base station 400 may define a PTRS CC group comprised of a plurality of CCs. In other words, the base station 400 may define CCs, which have the same phase noise characteristic because of the use of the same phase noise producing RF component (e.g., the same LO), as a PTRS CC group. It is noted that herein, when it is stated that a phase noise characteristic is "the same", the phase noise characteristic may be the same within a certain predefined range, i.e., exactly the same or nearly the same (similar).

The base station 400 may obtain PTRS CC group indication information in operation S401 and transmit the PTRS CC group indication information to the user terminal 410 through higher layer signaling in operation S402. At this time, the base station 400 may indicate that a phase noise characteristic by the RF component of the base station 400 is the same among the CCs included in the PTRS CC group. The PTRS CC group indication information may include information about the CCs in the PTRS CC group. As an example, assuming that the base station 400 supports CA using eight CCs having a frequency band of 100 MHz and uses one RF component when transmitting data using the first through fourth CCs among eight CCs, i.e., the first through eighth CCs, the PTRS CC group indication information may include information about the first through fourth CCs, e.g., the PTRS CC group indication information indicates that a phase noise characteristic of the base station 400 is the same among the first through fourth CCs.

The user terminal 410 may determine whether a phase noise characteristic of the RF component of the receiver of the user terminal 410 is the same among received CCs included in the PTRS CC group based at least in part on the information about the CCs, in operation S403. For example, the user terminal 410 may determine whether first through fourth CC signals are received through one LO with respect to the first through fourth CCs in the PTRS CC group.

When the user terminal 410 determines that the phase noise characteristic of the user terminal 410 is the same among the CCs in the PTRS CC group, the user terminal 410 may request the base station 400 to transmit a PTRS using one of the CCs included in the PTRS CC group in operation S404.

One of the CCs in the PTRS CC group may be called a "representative CC" or a "first CC". The first CC may be randomly selected from the CCs included in the PTRS CC group or determined in advance by the base station 400 and the user terminal 410. For example, when one primary CC is included in the PTRS CC group, it may be determined that a PTRS is transmitted using the primary CC. Alternatively, the user terminal 410 may feed back information about a CC (e.g., the first CC), through which a PTRS is received, to the base station 400 and request the base station 400 to transmit the PTRS using the CC.

As described above, when information about support or non-support of PTRS transmission through the first CC is exchanged between the base station 400 and the user terminal 410 in operations S402 through S404, the base station 400 may transmit a PTRS using the first CC in operation S405.

The user terminal 410 may estimate phase noise of a signal received using the first CC based on the PTRS, which is transmitted using the first CC, in operation S406.

The user terminal 410 may extract information (called phase noise compensation information), which is utilized to compensate for the estimated phase noise, in operation S407.

The user terminal 410 may compensate for the phase noise of all CC signals included in the PTRS CC group in operation S408.

According to an embodiment, when a PTRS is received using a single CC included in a PTRS CC group, estimation and compensation of phase noise may be performed with respect to all CCs included in the PTRS CC group without receiving a PTRS using other CCs, that is, without repeatedly transmitting a PTRS. This is because a phase noise characteristic of the base station 400 is the same as that of the user terminal 410 with respect to all CCs included in the PTRS CC group.

In the assignment of PTRS resources according to the 5G NR standards, a PTRS is independently transmitted for each CC in a wireless communication system supporting CA and a significant amount of wireless resources are needed to transmit PTRSs for all CCs. In a wireless communication system supporting CA, according to an example embodiment, a PTRS does not need to be repeatedly transmitted with respect to every CC, and accordingly, wireless resources assigned for PTRS transceiving may be reduced. As a result, wireless resources may be efficiently managed.

Figure 5A:
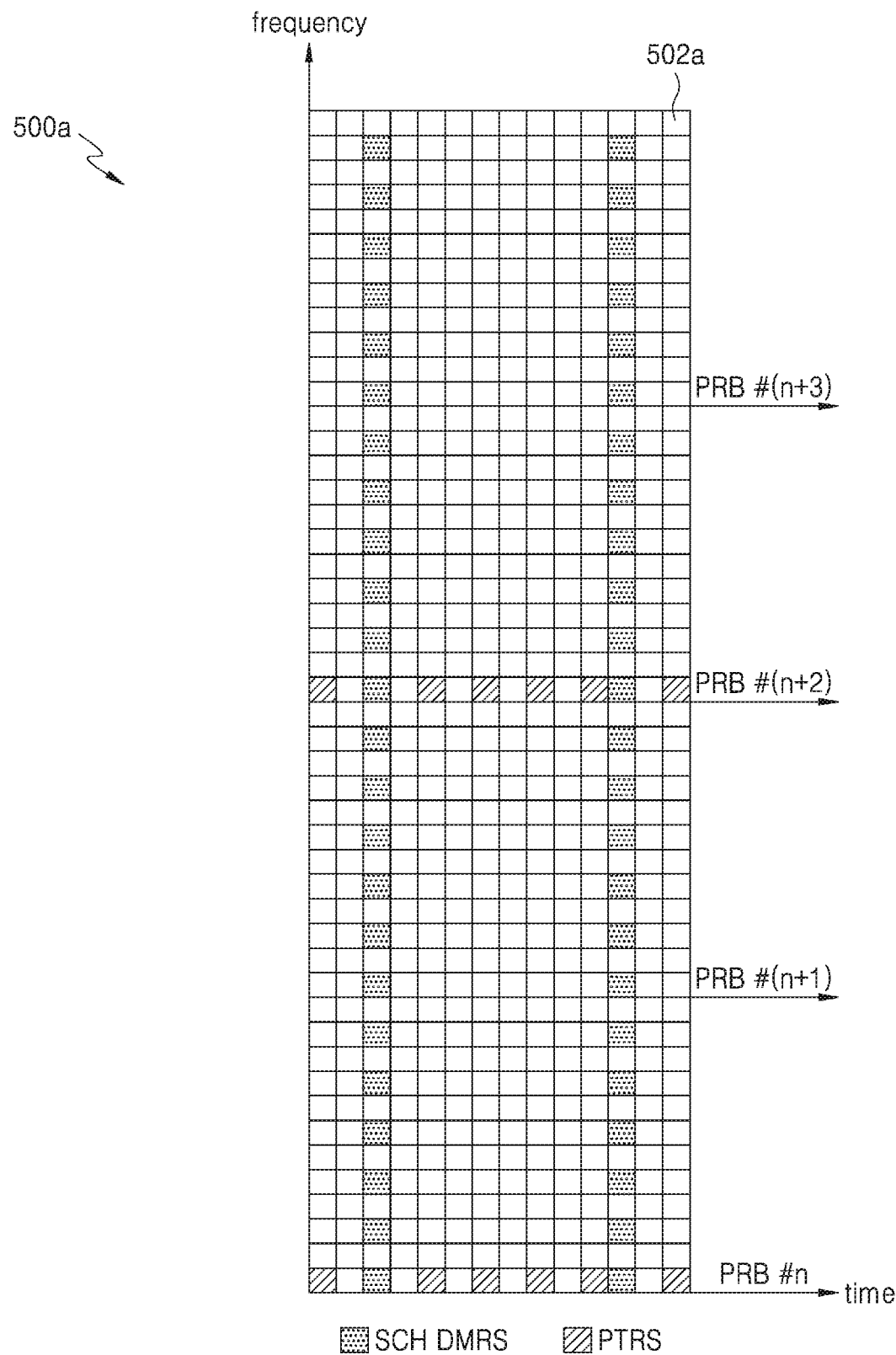
FIG. 5A is a graph of an example of phase tracking reference signal (PTRS) resource mapping for PTRS transmission.

FIG. 5A is a graph of an example of PTRS resource mapping for PTRS transmission, FIG. 5B is a table showing a time density of a PTRS with respect to a modulation coding scheme (MCS), and FIG. 5C is a table showing a frequency density of a PTRS with respect to an MCS.

FIG. 5A illustrates an example of a PTRS pattern and a shared channel (SCH) demodulation reference signal (DMRS) pattern, wherein an SCH DMRS is a reference signal used to estimate a channel value utilized to demodulate received data. Referring to FIG. 5A and the 5G NR standards, a PTRS is received together with data and is mapped to the same subcarrier position as a DMRS utilized to demodulate the data.

The PTRS pattern may be a resource grid 500a, as an example of a PTRS resource assignment method defined in the 5G NR standards, in which one PTRS resource is mapped per two symbols in a time domain and per two physical resource blocks (PRBs) in a frequency domain.

Taking into account a change in an LO over time, the 5G NR standards define a PTRS resource assignment method by which a PTRS may be transmitted per one, two, or four symbols in the time domain and per two or four PRBs in the frequency domain. A PTRS time density may be determined according to the number of symbols per which a PTRS resource is assigned, and a PTRS frequency density may be determined according to the number of PRBs per which a PTRS resource is assigned.

A PRB refers to a frequency-time resource unit for data transmission. Particularly in 5G, a PRB may be defined as a resource block number (e.g., PRB #n or PRB #(n+1)) from a start point of a bandwidth part (BWP) agreed between a base station and a user terminal. A single PRB may be comprised of a plurality of resource elements (REs) 502a consecutive in the frequency-time domain. A single RE 502a may be defined as a physical resource comprised of a single symbol and a single subcarrier.

FIG. 5B shows the number of symbols per which a PTRS is transmitted according to a scheduled MCS index, which is defined in the 5G NR standards, e.g., TS 38.214. An MCS may be defined as a combination of a spatial stream, a modulation mode, a coding rate, and the like. A transmission rate may be determined according to an MCS index.

$I_{MCS}$ may be defined as an MCS index. For example, $I_{MCS}$ may be transmitted in every slot when a base station transmits data to a user terminal. ptrs-$MCS_1$ through ptrs-$MCS_4$ may have a value in a range from MCS index 0 to 29 when MCS index table 1 is used. The range of MCS index numbers may be different according to which MCS index table is used. For example, a base station may provide ptrs-$MCS_1$ through ptrs-$MCS_4$ to a user terminal through higher layer signaling. $L_{PT-RS}$ is a value indicating a PTRS time density and may be expressed as a gap between a current PTRS symbol and a subsequent PTRS symbol.

According to an embodiment, when a base station transmits $I_{MCS}$ corresponding to MCS 6, which is an MCS index assigned to a user terminal, to the user terminal and MCS 6 is greater than ptrs-$MCS_2$ and less than ptrs-$MCS_3$, $L_{PT-RS}$ may be 2, and accordingly, a single PTRS resource may be mapped and transmitted per two symbols.

FIG. 5C shows the number of resource blocks (or PRBs) per which a PTRS is transmitted according to a scheduled bandwidth, which is defined in the 5G NR standards, e.g., TS 38.214. $N_{RB1}$ may be defined as the number of resource blocks. For example, $N_{RB}$ may indicate the number of PRBs actually assigned when a base station transmits data to a user terminal. $N_{RB0}$ or $N_{RB1}$ may indicate the number of resource blocks that is configured by a base station. $K_{PT-RS}$ is a value indicating a PTRS frequency density and may be expressed as a gap between a current PTRS subcarrier and a subsequent PTRS subcarrier.

For example, when the number (i.e., ($N_{RB}$) of PRBs assigned by a base station to transmit certain data is less than $N_{RB0}$, there may be no wireless resources assigned for PTRS transmission (e.g., PT-RS is not present). When the number (i.e., $N_{RB}$) of PRBs assigned by a base station to transmit certain data is greater than or equal to $N_{RB1}$, $K_{PT-RS}$ may be 4, and accordingly, a single PTRS resource may be mapped and transmitted per four PRBs. In other words, when sufficient wireless resources greater than or equal to $N_{RB1}$ are assigned, sufficient PTRSs may be transmitted even if a PTRS frequency density is relatively low (e.g., $K_{PT-RS}$ is four).

According to the 5G NR standards, in the case of CA, a PTRS is independently transmitted for each CC according to the PTRS resource assignment method described above. For a user terminal, CCs may experience the same phase noise as or different phase noise from each other according to whether a base station transmits data using the same LO with respect to each CC or whether the user terminal receives data using the same LO with respect to each CC. According to the 5G NR standards, because a PTRS is independently transmitted for each CC, information about whether the phase noise characteristic of a base station is the same among CCs is not provided to a user terminal, and therefore, the user terminal needs to track phase noise with respect to each CC using a respective PTRS. In this case, a wireless resource needs to be assigned to each CC for PTRS transmission, and accordingly, a significant amount of wireless resources are used for PTRS transmission. For example, when a PTRS 1-port is transmitted per one symbol in the time domain and per two PRBs in the frequency domain, a proportion of wireless resources used for PTRS transmission to total wireless resources is about 3.5%. When a PTRS 2-port is transmitted per one symbol in the time domain and per two PRBs in the frequency domain in the same configuration as the PTRS 1-port, a proportion of wireless resources used for PTRS transmission to total wireless resources is about 7%.

When a PTRS is transmitted using only one CC among all CCs included in a PTRS CC group, according to an example embodiment, wireless resources used for PTRS transceiving may be reduced, and wireless resources for other data transmission may be increased. As a result, wireless resources may be efficiently managed.

Figure 6:
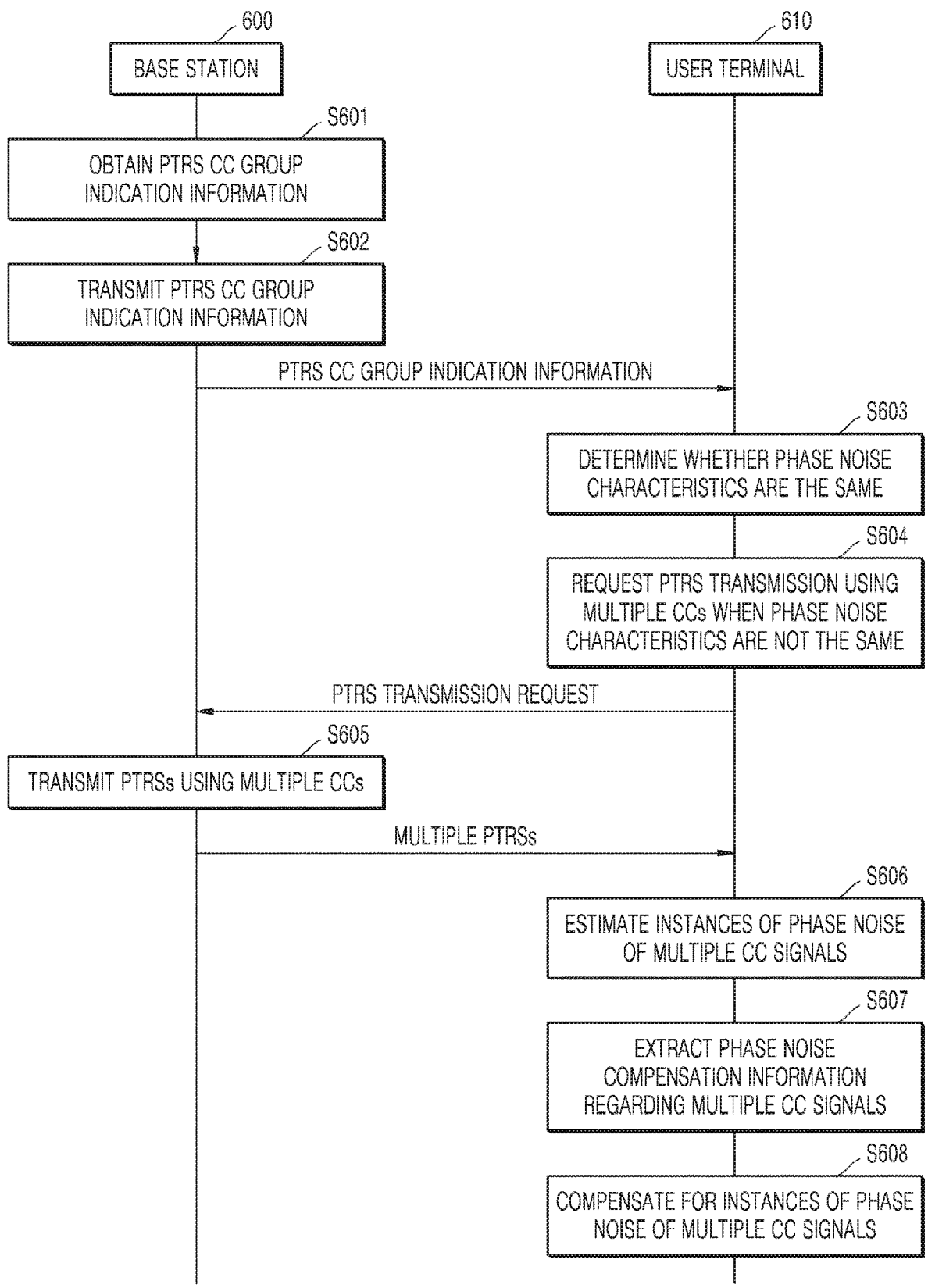
FIG. 6 is a flowchart of the operations of a base station and a user terminal, according to an example embodiment.

FIG. 6 is a flowchart of the operations of a base station and a user terminal, according to an example embodiment.

FIG. 6 shows a PTRS transmission scenario of a base station 600 and a user terminal 610 in the case where the phase noise characteristic of the user terminal 610 is not the same among CCs in a PTRS CC group when the base station 600 transmits data to the user terminal 610.

The base station 600 may define a PTRS CC group comprised of a plurality of CCs. In other words, the base station 600 may define CCs, which have the same phase noise characteristic because of the use of the same RF component (e.g., the same LO), as a PTRS CC group.

The base station 600 may obtain PTRS CC group indication information in operation S601 and transmit the PTRS CC group indication information to the user terminal 610 through higher layer signaling in operation S602. At this time, the base station 600 may guarantee that a phase noise characteristic by the RF component of the base station 600 is the same among the CCs included in the PTRS CC group. The PTRS CC group indication information may include information about the CCs in the PTRS CC group. Assuming that the base station 600 supports CA using eight CCs having a frequency band of 100 MHz and uses one RF component when transmitting data using the first through fourth CCs among eight CCs, i.e., the first through eighth CCs, the PTRS CC group indication information may include information about the first through fourth CCs, for example, information indicating that the first through fourth CCs are included in the PTRS CC group or information indicating that the phase noise characteristic of the base station 600 is the same among the first through fourth CCs.

The user terminal 610 may determine whether a phase noise characteristic by the RF component of the receiver of the user terminal 610 is the same among received CCs included in the PTRS CC group based on the information about the CCs, in operation S603. For example, the user terminal 610 may determine whether first through fourth CC signals are received through one LO with respect to the first through fourth CCs in the PTRS CC group.

When the user terminal 610 determines that the phase noise characteristic of the user terminal 410 is not the same among the CCs in the PTRS CC group, the user terminal 610 may request the base station 600 to transmit PTRSs respectively using all CCs (e.g., multiple CCs) included in the PTRS CC group in operation S604.

As described above, when the information is exchanged between the base station 600 and the user terminal 610 in operations S602 through S604, the base station 600 may transmit multiple PTRSs (e.g., the first through N-th PTRSs) using multiple CCs (e.g., the first through N-th CCs when the PTRS CC group is comprised of N CCs) included in the PTRS CC group in operation S605.

The user terminal 610 may estimate instances of phase noise (e.g., the first through N-th instances of phase noise) of respective CC signals (e.g., the first through N-th CC signals) of the PTRS CC group based on the received PTRSs (e.g., the first through N-th PTRSs) in operation S606.

The user terminal 610 may extract information (called phase noise compensation information, e.g., first through N-th instances of compensation information), which is utilized to compensate for the estimated instances of phase noise, in operation S607.

The user terminal 610 may compensate for the instances of phase noise (e.g., the first through N-th instances of phase noise) of the respective CC signals (e.g., the first through N-th CC signals) included in the PTRS CC group in operation S608.

According to an embodiment, when the phase noise characteristic of the user terminal 610 is not the same among CCs included in a PTRS CC group, a PTRS may be independently transmitted with respect to each CC, and phase noise may be independently measured and compensated for with respect to each CC signal.

Figure 7:
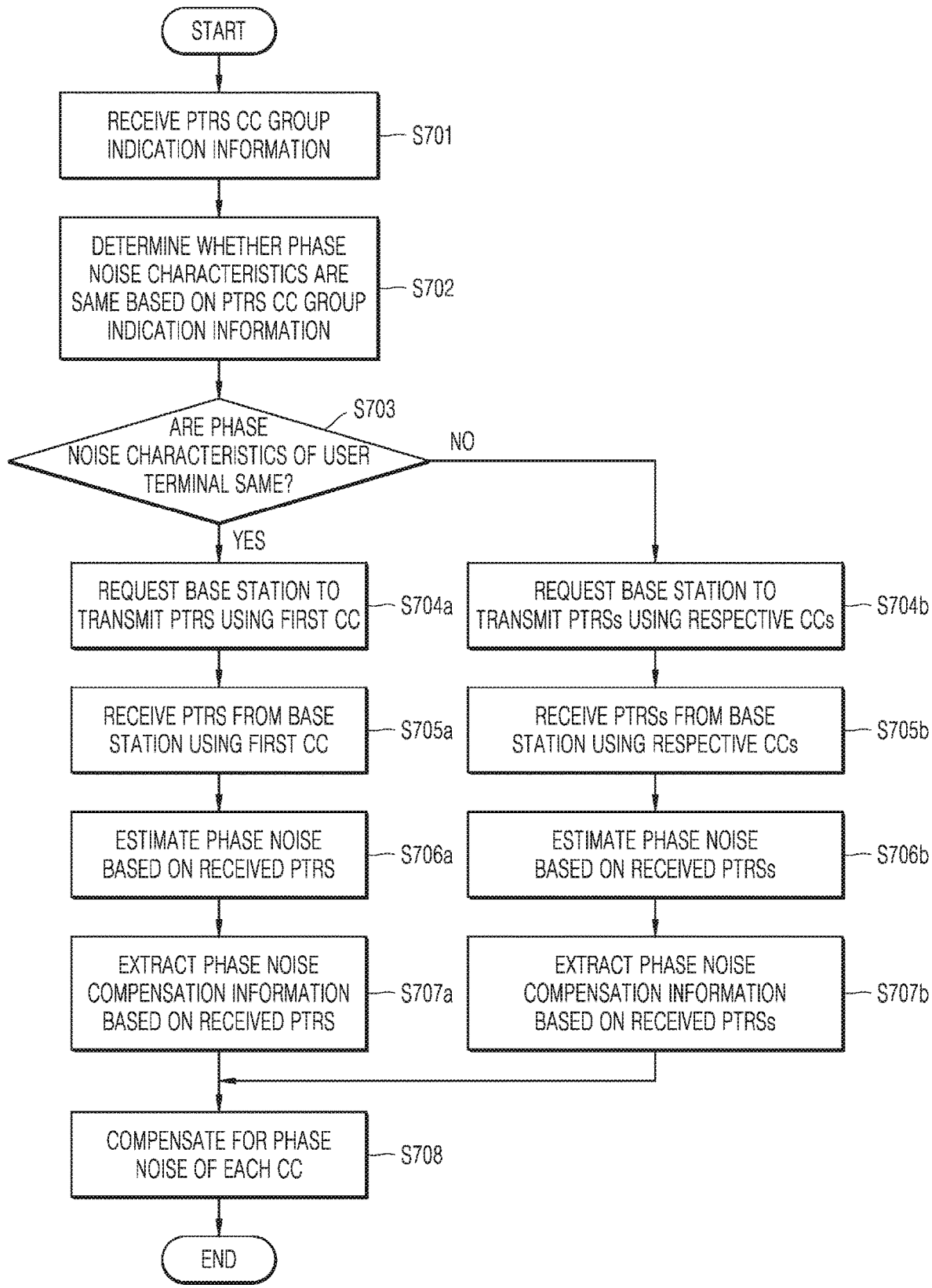
FIG. 7 is a flowchart of the operations of a receiver of a user terminal, according to an example embodiment.

FIG. 7 is a flowchart of the operations of a receiver of a user terminal, according to an example embodiment.

FIG. 7 is a flowchart of a method, performed by a user terminal, of receiving a PTRS according to whether the phase noise characteristic of the user terminal is the same among CCs included in a PTRS CC group when a base station transmits data to the user terminal in a wireless communication system supporting CA.

The user terminal may receive PTRS CC group indication information from the base station in operation S701. For example, the PTRS CC group indication information may include information indicating that in the base station supporting CA using eight contiguous CCs having a frequency band of 100 MHz, the first through fourth CCs are included in one PTRS CC group.

The user terminal may determine whether a phase noise characteristic by an RF component of a receiver of the user terminal is the same among the CCs included in the PTRS CC group based on the PTRS CC group indication information in operation S702. For example, the user terminal may determine whether the phase noise characteristic by an LO of a receiver of the user terminal is the same with respect to signals received using the first through fourth CCs included in the PTRS CC group. For example, a test is performed on a phase noise characteristic of the user terminal, and whether the phase noise characteristic is the same among the CCs may be determined using a predefined table.

When the user terminal determines that the phase noise characteristic of the user terminal is the same among the CCs included in the PTRS CC group (in case of YES), the user terminal may request the base station to transmit a PTRS using a single CC, e.g., the first CC, among the CCs included in the PTRS CC group in operation S703.

The user terminal may receive the PTRS from the base station using the first CC in operation S705a. Operations S706a, S707a, and S708 are substantially the same as or similar to operations S406 through S408 in FIG. 4, and thus, descriptions thereof are omitted.

As described above, when the user terminal determines that the phase noise characteristic of the user terminal is the same among the CCs included in the PTRS CC group (in case of YES), the user terminal may identify the phase noise characteristic of a signal transmitted using every time-synchronized CC even if a PTRS wireless resource is assigned to only one CC.

When the user terminal determines that the phase noise characteristic of the user terminal is not the same among the CCs included in the PTRS CC group (in case of NO), the user terminal may request the base station to transmit PTRSs respectively using the CCs included in the PTRS CC group in operation S704b. Operation S704b are substantially the same as or similar to operation S604.

The user terminal may receive the PTRSs from the base station using the respective CCs in operation S705b. Operations S706b, S707b, and S708 are substantially the same as or similar to operations S606 through S608 in FIG. 6, and thus, descriptions thereof are omitted.

Figure 8:
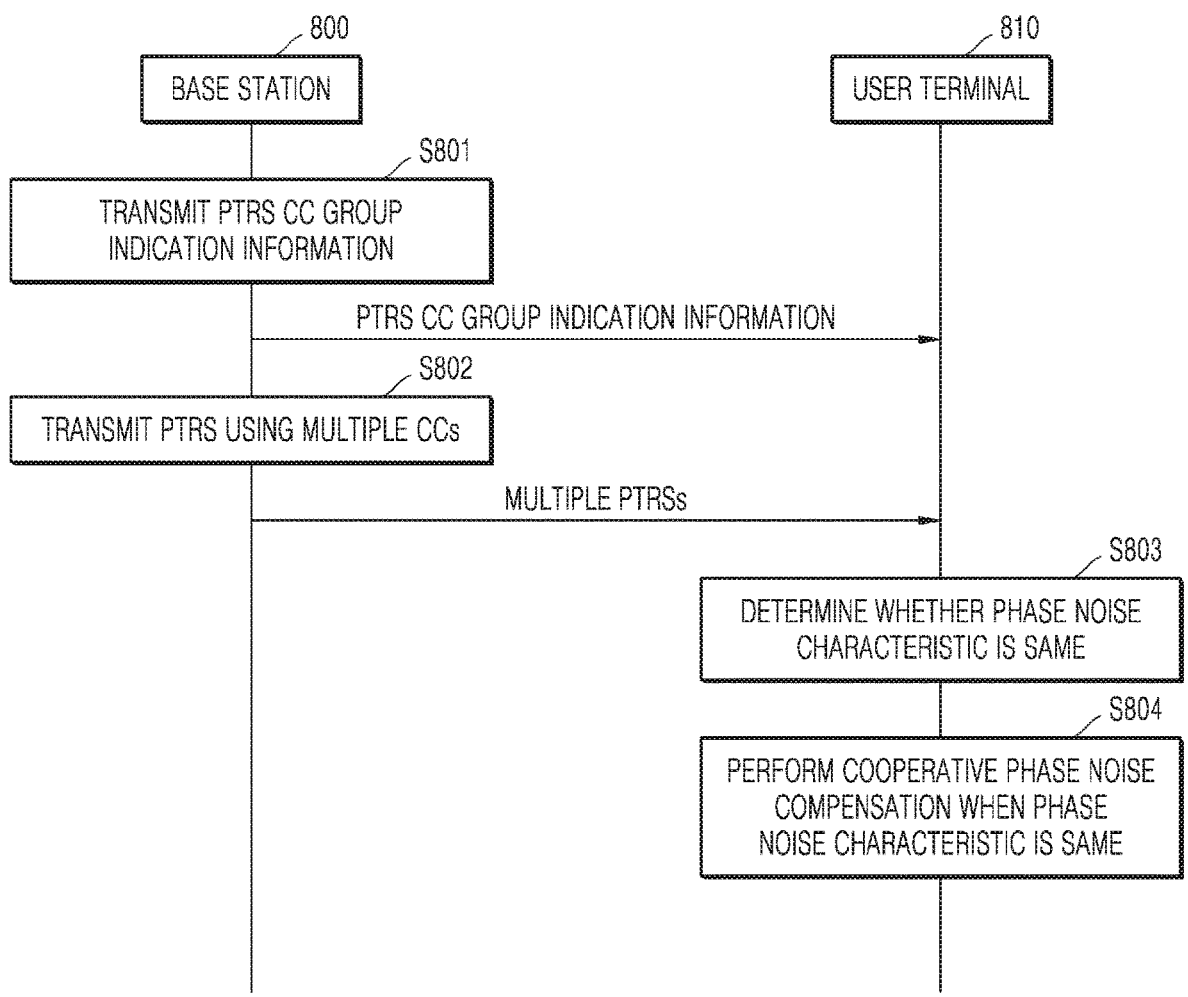
FIGS. 8 and 9 are flowcharts of the operations of a base station and a user terminal, according to example embodiments.
Figure 9:
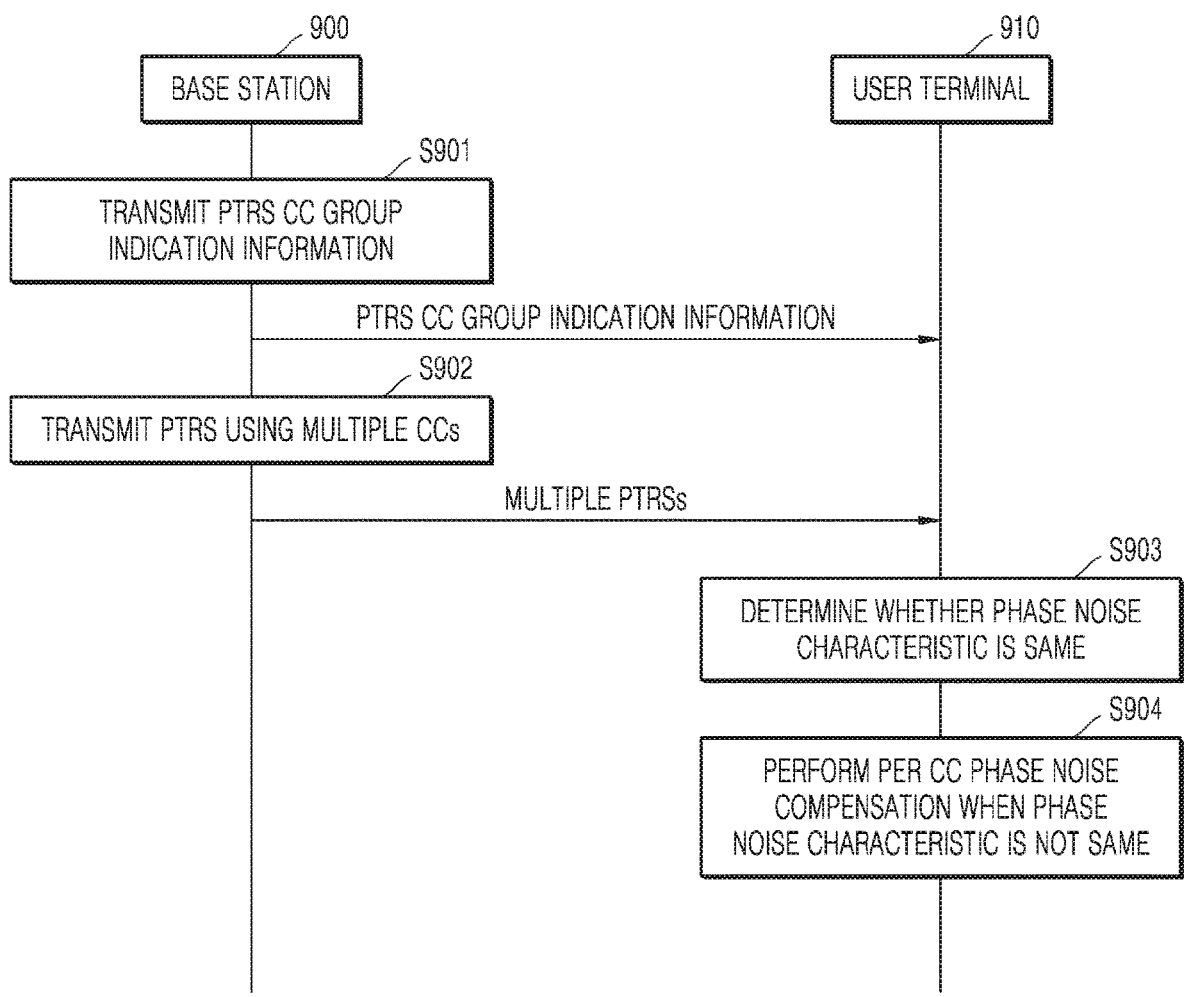

FIGS. 8 and 9 are flowcharts of the operations of a base station and a user terminal, according to example embodiments.

FIGS. 8 and 9 respectively depict a scenario of PTRS transmission between a base station 800 and a user terminal 810 and a scenario of PTRS transmission between a base station 900 and a user terminal 910 when the user terminals 810 and 910 perform phase noise compensation using all PTRSs received using all CCs included in a PTRS CC group without feedback requesting PTRS transmission from the base station 800 or 900. FIG. 8 is a flowchart of a method of transmitting a PTRS to perform cooperative phase noise compensation, and FIG. 9 is a flowchart of a method of transmitting a PTRS to perform per CC phase noise compensation.

The base station 800 may transmit PTRS CC group indication information to the user terminal 810 through higher layer signaling in operation S801, and the base station 900 may transmit PTRS CC group indication information to the user terminal 910 through higher layer signaling in operation S901.

Unlike the embodiments of FIGS. 4 and 6, referring to FIGS. 8 and 9, an operation (so called, handshaking between the base station 800 or 900 and the user terminal 810 or 910) of determining the sameness/similarity of a phase noise characteristic by an RF component of a receiver of the user terminal 810 or 910 and requesting the base station 800 or 900 to transmit a PTRS using the first CC (i.e., a single CC) or all CCs (i.e., multiple CCs) is omitted. For example, the omission occurs when handshaking may not be performed because of overhead between the base station 800 or 900 and the user terminal 810 or 910 or may have been set in advance not to be performed.

Multiple PTRSs may be transmitted using multiple CCs included in a PTRS CC group in operations S802 and S902.

The user terminal 810 or 910 may determine whether a phase noise characteristic by an RF component of a receiver of the user terminal 810 or 910 is the same among the CCs included in the PTRS CC group in operation S803 or S903.

When the user terminal 810 determines that the phase noise characteristic of the user terminal 810 is the same with respect to the CCs included in the PTRS CC group, the user terminal 810 may perform "cooperative phase noise compensation" in operation S804.

According to the 5G NR standards, a wireless communication system supporting CA may transmit a PTRS independently for each CC to compensate for phase noise, and the PTRS may be used to compensate for the phase noise of the CC. Conversely, when the cooperative phase noise compensation is performed, phase noise measurement and compensation may be performed using PTRSs transmitted using a single CC included in the PTRS CC group. Therefore, the number of observations that may be used for phase noise compensation may be increased and the accuracy and performance of phase noise measurement and compensation may be enhanced.

When the user terminal 910 determines that the phase noise characteristic of the user terminal 910 is not the same with respect to the CCs included in the PTRS CC group, the user terminal 910 may perform per CC phase noise compensation in operation S904.

In an alternative embodiment to that described for FIG. 8, operations S802 and S803 are omitted. This embodiment assumes that the base station utilizes the same PTRS for all of the CCs in the PTRS CC group, and that the user terminal 810 downconverts the CCs using a single LO. Because a single LO is used on receive for the downconversion, the user terminal 810 assumes the phase noise characteristic at the user terminal 810 is the same for all of the CCs in the PTRS CC group. Therefore, there is no need for the base station S801 to transmit one or more PTRSs using multiple CCs as in operation S802, and there is no need to determine whether the phase noise characteristic at the user terminal 810 is the same in operation S803. This embodiment has the benefit of avoiding the redundant transmission and reception of the same PTRS information for multiple CCs.

Figure 10:
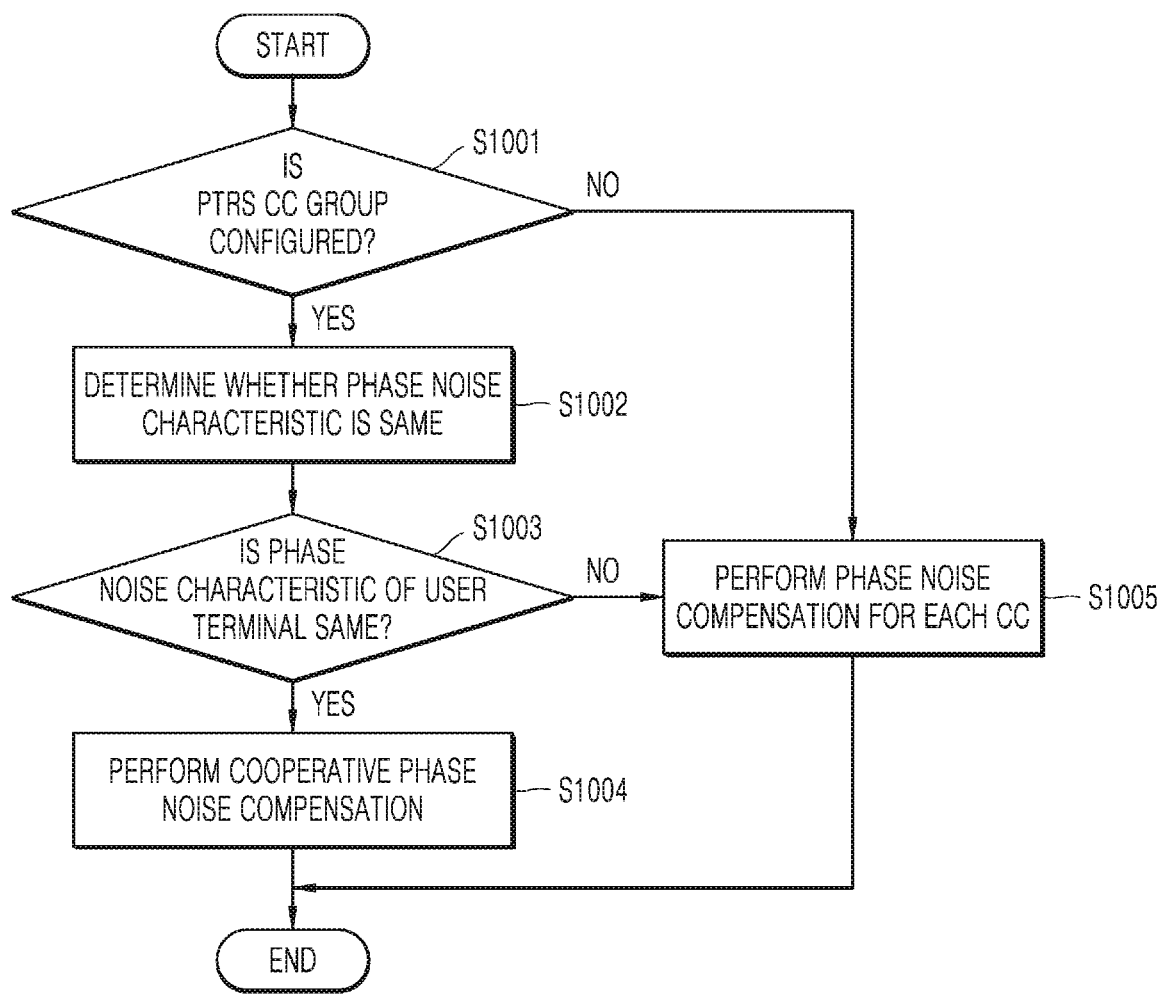
FIG. 10 is a flowchart of the operations of a receiver of a user terminal, according to an example embodiment.

FIG. 10 is a flowchart of the operations of a receiver of a user terminal, according to an example embodiment.

FIG. 10 is a flowchart of the operations of a user terminal performing phase noise compensation using all PTRSs received using all CCs included in a PTRS CC group without feedback requesting a base station to transmit a PTRS.

When the user terminal determines in operation S1001 that a PTRS CC group is available because PTRS CC group indication information is received and the PTRS CC group is configured, the user terminal may determine whether a phase noise characteristic by an RF component of a receiver of the user terminal is the same with respect to CCs included in the PTRS CC group in operation S1002.

When the user terminal determines that the phase noise characteristic of the user terminal is the same with respect to the CCs included in the PTRS CC group in operation S1003, the user terminal may perform cooperative phase noise compensation in operation S1004.

When the user terminal determines in operation S1001 that the PTRS CC group is not available because no information regarding the PTRS CC group is received from a base station and the PTRS CC group is not configured or when the user terminal determines that the phase noise characteristic of the user terminal is not the same with respect to the CCs included in the PTRS CC group in operation S1003, the user terminal may perform per CC phase noise compensation in operation S1005.

Figure 11A:
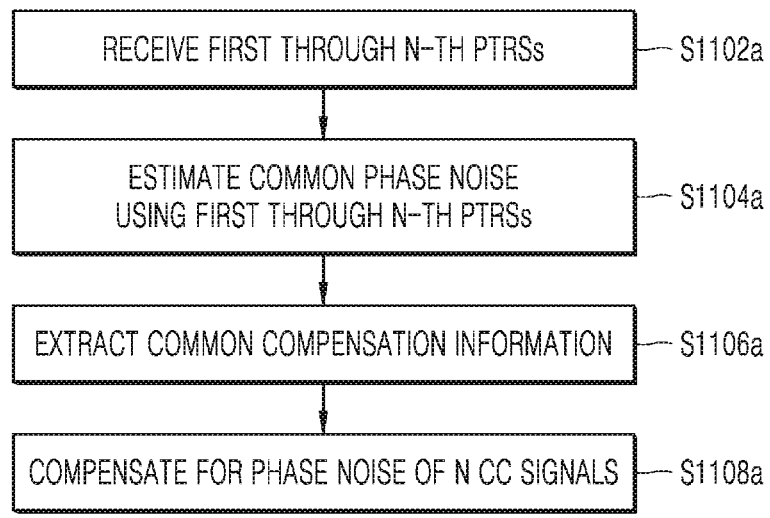
FIGS. 11A and 11B are flowcharts of phase noise compensating methods of a user terminal in FIG. 10.
Figure 11B:
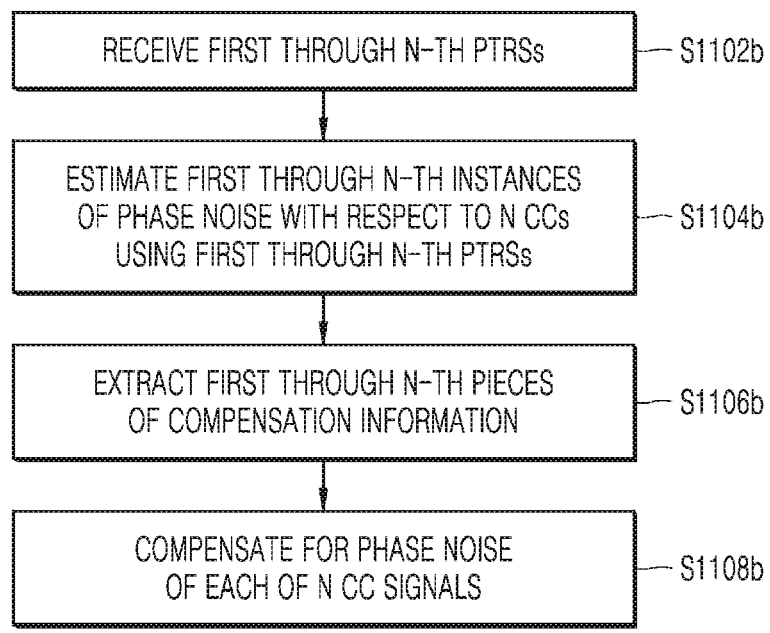

FIGS. 11A and 11B are flowcharts of methods of performing the phase noise compensation in FIG. 10.

As described with reference to FIGS. 8 through 10, FIGS. 11A and 11B show examples of a method, performed by a user terminal, of performing phase noise compensation using all PTRSs received using all CCs included in a PTRS CC group without feedback requesting a base station to transmit a PTRS.

FIG. 11A is a flowchart of a method, performed by a user terminal, of performing cooperative phase noise compensation.

The user terminal may receive PTRSs through all of N CCs included in a PTRS CC group in operation S1102a. In other words, the user terminal may receive first through N-th PTRSs.

The user terminal may estimate common phase noise using the first through N-th PTRSs all together in operation S1104a.

The user terminal may extract common compensation information to compensate for the estimated common phase noise in operation S1106a.

The user terminal may compensate for phase noise with respect to each of CC signals included in the PTRS CC group using the common compensation information in operation S1108a.

Differently from the case of independent phase noise compensation in which estimation and compensation of phase noise of a first CC signal is performed using the first PTRS, estimation and compensation of phase noise of a second CC signal is performed using the second PTRS, and so on, the phase noise of a signal is compensated for using PTRSs that have been transmitted using other CCs together, and therefore, the performance of phase noise compensation may be enhanced.

FIG. 11B is a flowchart of a method, performed by a user terminal, of performing "Per component phase noise compensation".

The user terminal may receive PTRSs through all of N CCs included in a PTRS CC group in operation S1102b. In other words, the user terminal may receive first through N-th PTRSs.

The user terminal may estimate first through N-th instances of phase noise with respect to respective first through N-th CC signals using the first through N-th PTRSs all together in operation S1104b.

The user terminal may extract first through N-th pieces of compensation information to compensate for the first through N-th instances of phase noise in operation S1106b.

The user terminal may compensate for a phase noise with respect to each of the first through N-th CC signals included in the PTRS CC group using the first through N-th pieces of compensation information in operation S1108b.

Figure 12:
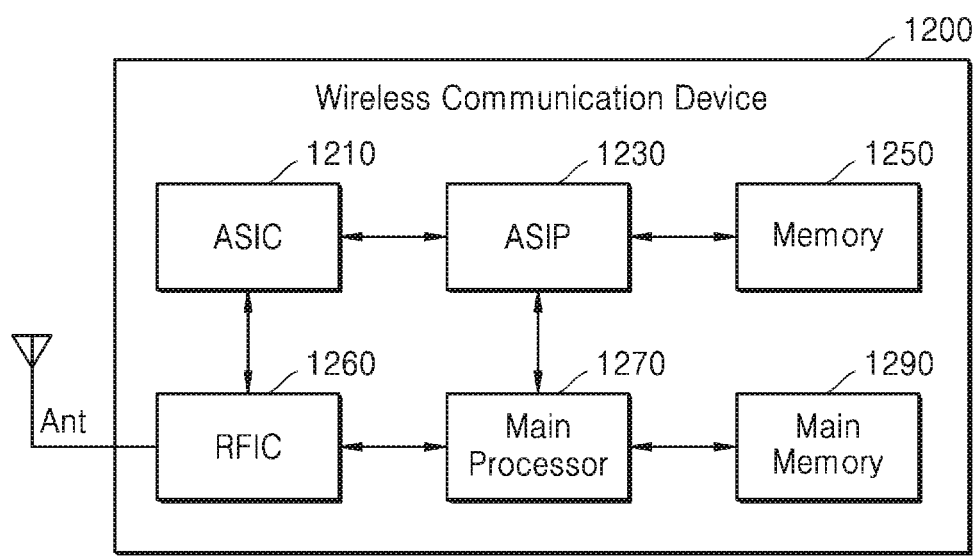
FIG. 12 is a block diagram of a wireless communication device according to an example embodiment.

FIG. 12 is a block diagram of a wireless communication device according to an example embodiment.

Referring to FIG. 12, a wireless communication device 1200 may include a modem (not shown) and a radio frequency integrated circuit (RFIC) 1260. The modem may include an application specific IC (ASIC) 1210, an application specific instruction set processor (ASIP) 1230, a memory 1250, a main processor 1270, and a main memory 1290. The wireless communication device 1200 of FIG. 12 may correspond to a user terminal, according to an embodiment.

The RFIC 1260 may be connected to an antenna Ant and may receive a signal from the outside or transmit a signal to the outside using a wireless communication network. The RFIC 1260 may include receiver circuits described with reference to FIGS. 2A through 2C or a transceiver described with reference to FIGS. 3A and 3B. The RFIC 1260 may exchange a plurality of carriers with the modem. According to an embodiment, the RFIC 1260 may receive an RF signal using CA through a single antenna Ant and extract a plurality of CC signals. The RFIC 1260 may also receive indication information regarding a PTRS CC group and receive a PTRS using a random CC included in the PTRS CC group.

As an IC customized to a particular use, the ASIP 1230 may support an instruction set dedicated to a particular application and execute instructions included in the instruction set. The memory 1250 may communicate with the ASIP 1230 and store, as a non-transitory storage device, a plurality of instructions executed by the ASIP 1230. As a non-limiting example, the memory 1250 may include any type of memory, such as random access memory (RAM), read-only memory (ROM), tape, a magnetic disk, an optical disk, volatile memory, non-volatile memory, or a combination thereof, which is accessible by the ASIP 1230.

The main processor 1270 may control the wireless communication device 1200 by executing the instructions. For example, the main processor 1270 may control the ASIC 1210 and the ASIP 1230, process data received through a wireless communication network, or process a user input of the wireless communication device 1200. The main memory 1290 may communicate with the main processor 1270 and store, as a non-transitory storage device, a plurality of instructions executed by the main processor 1270. As a non-limiting example, the main memory 1290 may include any type of memory, such as RAM, ROM, tape, a magnetic disk, an optical disk, volatile memory, non-volatile memory, or a combination thereof, which is accessible by the main processor 1270.

While embodiments of the inventive concept have been particularly shown and described with reference to examples thereof, it will be understood that various changes in form and details may be made therein without departing from the spirit and scope of the following claims.

What is claimed is:

1. An operating method of a user terminal in a wireless communication system supporting carrier aggregation (CA), the operating method comprising:
   receiving indication information regarding a phase tracking reference signal (PTRS) component carrier (CC) group from a base station;
   determining whether a phase noise characteristic of the user terminal is the same with respect to CCs included in the PTRS CC group based at least in part on the indication information;
   requesting the base station to transmit at least one PTRS using at least one CC included in the PTRS CC group, in accordance with the determination; and
   receiving the at least one PTRS from the base station using the at least one CC.

2. The operating method of claim 1, wherein the PTRS CC group includes a plurality of CCs, and
   a phase noise characteristic of the base station is the same with respect to the plurality of CCs.

3. The operating method of claim 1, wherein the requesting of the base station to transmit the at least one PTRS using the at least one CC included in the PTRS CC group includes:
requesting the base station to transmit the at least one PTRS using a first CC included in the PTRS CC group when it is determined that the phase noise characteristic of the user terminal is the same.

4. The operating method of claim 3, further comprising:
estimating phase noise of a signal based on the at least one PTRS, the signal being based on the first CC;
extracting compensation information for compensating for the phase noise of the signal; and
compensating for the phase noise of the signal using the compensation information.

5. The operating method of claim 1, wherein the requesting of the base station to transmit the at least one PTRS using the at least one CC included in the PTRS CC group includes:
requesting the base station to transmit first through N-th PTRSs using N CCs included in the PTRS CC group when it is determined that the phase noise characteristic of the user terminal is not the same, where N is a natural number of at least two.

6. The operating method of claim 5, further comprising:
estimating first through N-th instances of phase noise of respective signals respectively based on the first through N-th PTRSs, the signals being respectively based on the N CCs;
extracting first through N-th pieces of compensation information for respectively compensating for the first through N-th instances of phase noise; and
compensating for the first through N-th instances of phase noise of the signals using the first through N-th pieces of compensation information, the signals being respectively based on the N CCs.

7. The operating method of claim 1, wherein a determination as to whether the phase noise characteristic of the user terminal is the same is made according to whether the user terminal uses a same local oscillator for the CCs included in the PTRS CC group.

8. An operating method of a user terminal in a wireless communication system supporting carrier aggregation (CA), the operating method comprising:
receiving indication information regarding a phase tracking reference signal (PTRS) component carrier (CC) group from a base station;
receiving first through N-th PTRSs from the base station using N CCs included in the PTRS CC group, where N is a natural number of at least two;
determining whether a phase noise characteristic of the user terminal is the same with respect to the N CCs based at least in part on the indication information; and
performing cooperative phase noise compensation based on the first through N-th PTRSs when it is determined that the phase noise characteristic of the user terminal is the same.

9. The operating method of claim 8, wherein phase noise of the base station is the same with respect to the N CCs.

10. The operating method of claim 8, wherein a determination as to whether the phase noise characteristic of the user terminal is the same is made according to whether the user terminal uses a same local oscillator for the N CCs included in the PTRS CC group.

11. The operating method of claim 8, wherein the performing of the cooperative phase noise compensation includes:
estimating common phase noise based on the first through N-th PTRSs;
extracting common compensation information for compensating for the common phase noise; and
compensating for a phase noise of a signal using the common compensation information, the signal being based on at least one of the N CCs.

12. The operating method of claim 11, wherein the common compensation information includes at least one information item selected from a time density of a radio resource assigned to each PTRS, a frequency density thereof, a position thereof on a time axis, and a position thereof on a frequency axis.

13. A user terminal in a wireless communication system supporting carrier aggregation (CA),
the user terminal comprising:
a transceiver configured to receive indication information regarding a phase tracking reference signal (PTRS) component carrier (CC) group from a base station; and
a controller configured to determine whether a phase noise characteristic of a user terminal is the same with respect to CCs included in the PTRS CC group, based at least in part on the indication information, and request the base station to transmit at least one PTRS using at least one CC included in the PTRS CC group,
wherein the transceiver is further configured to receive the at least one PTRS from the base station using the at least one CC.

14. The user terminal of claim 13, wherein the PTRS CC group includes a plurality of CCs, and
a phase noise characteristic of the base station is the same with respect to the plurality of CCs.

15. The user terminal of claim 13, wherein the controller is further configured to request the base station to transmit the at least one PTRS using a first CC included in the PTRS CC group when it is determined that the phase noise characteristic of the user terminal is the same.

16. The user terminal of claim 15, wherein the controller is further configured to estimate a phase noise of a signal based on the at least one PTRS, the signal being based on the first CC; extract compensation information for compensating for the phase noise of the signal; and compensate for the phase noise of the signal using the compensation information.

17. The user terminal of claim 15, wherein the first CC is randomly selected from the at least one CC included in the PTRS CC group.

18. The user terminal of claim 13, wherein the controller is further configured to request the base station to transmit first through N-th PTRSs using N CCs included in the PTRS CC group when it is determined that the phase noise characteristic of the user terminal is not the same, where N is a natural number of at least two.

19. The user terminal of claim 18, wherein the controller is further configured to estimate first through N-th instances of phase noise of respective signals respectively based on the first through N-th PTRSs, the signals being respectively based on the N CCs; extract first through N-th pieces of compensation information for respectively compensating for the first through N-th instances of phase noise; and compensate for the first through N-th instances of phase noise of the signals using the first through N-th pieces of compensation information, the signals being respectively based on the N CCs.

20. The user terminal of claim 13, wherein a determination as to whether the phase noise characteristic of the user terminal is the same is made according to whether the user terminal uses a same local oscillator for the CCs included in the PTRS CC group.

\* \* \* \* \*